(No Model.) 8 Sheets—Sheet 1.
J. P. GILL.
APPARATUS FOR THE MANUFACTURE AND APPLICATION OF GASES AND VAPORS.
No. 283,998. Patented Aug. 28, 1883.
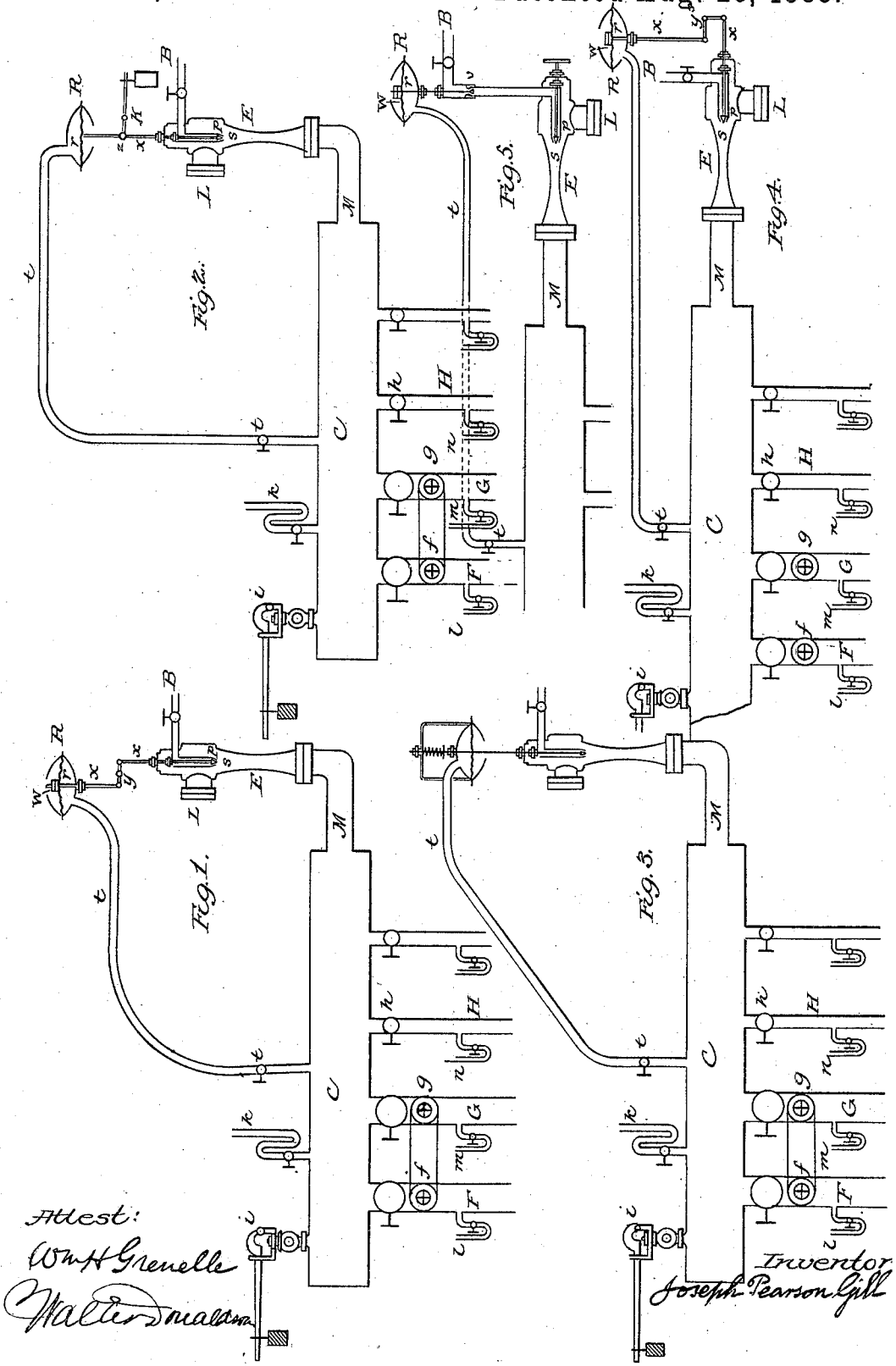

(No Model.) 8 Sheets—Sheet 2.
J. P. GILL.
APPARATUS FOR THE MANUFACTURE AND APPLICATION OF GASES AND VAPORS.
No. 283,998. Patented Aug. 28, 1883.
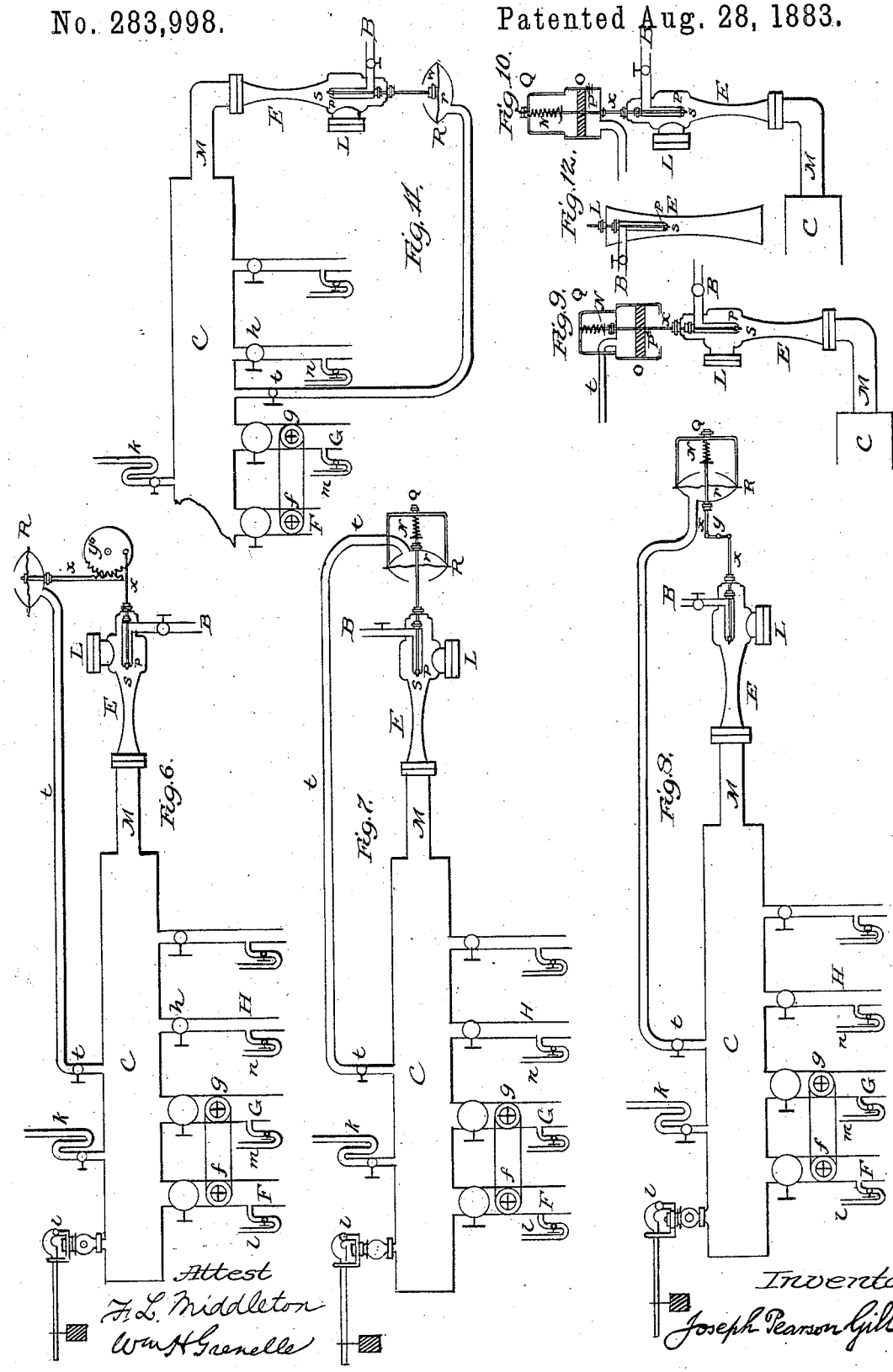

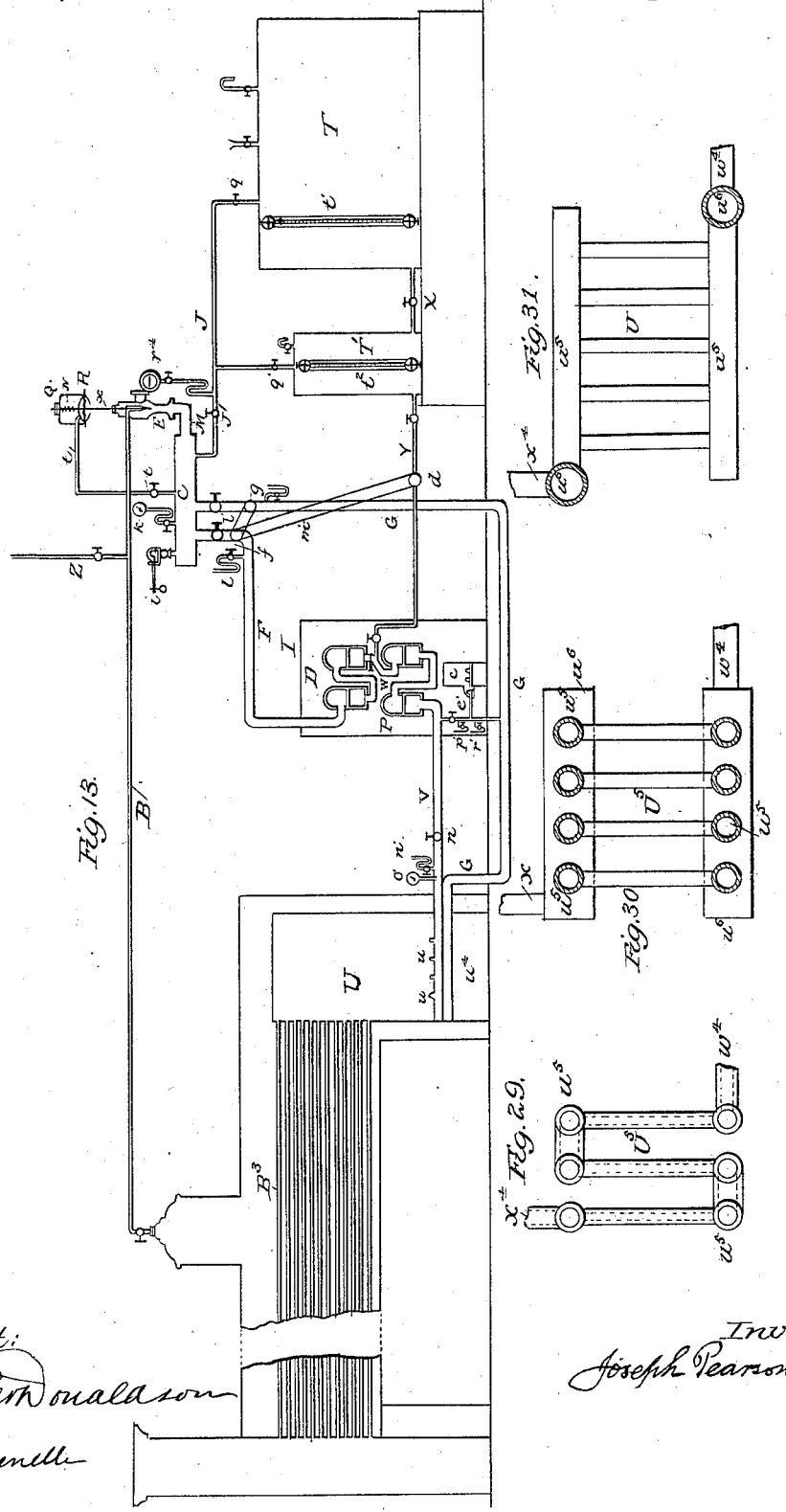

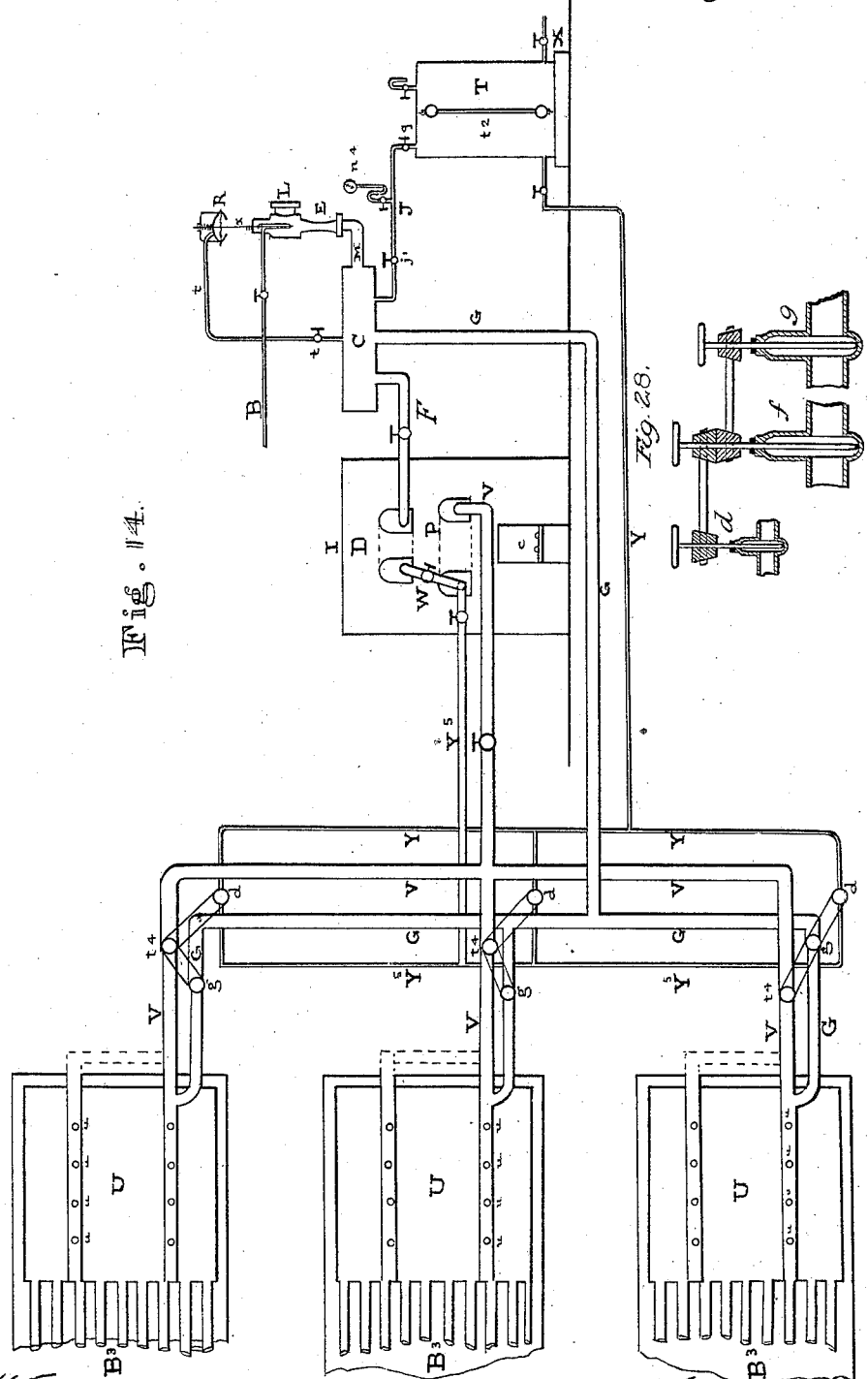

(No Model.) 8 Sheets—Sheet 5.
J. P. GILL.
APPARATUS FOR THE MANUFACTURE AND APPLICATION OF GASES AND VAPORS.
No. 283,998. Patented Aug. 28, 1883.
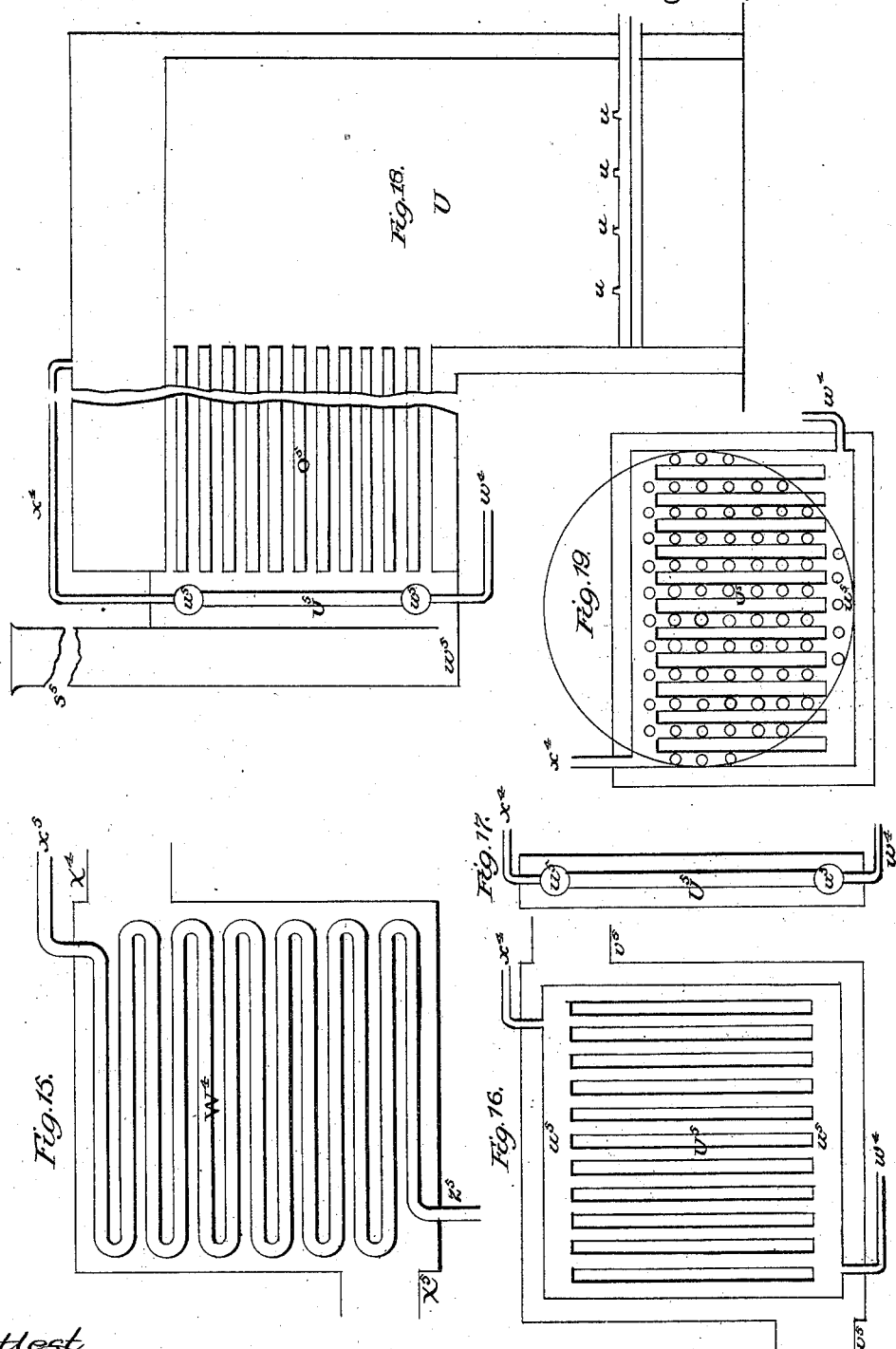

(No Model.)   8 Sheets—Sheet 6.
J. P. GILL.
APPARATUS FOR THE MANUFACTURE AND APPLICATION OF GASES AND VAPORS.
No. 283,998. Patented Aug. 28, 1883.
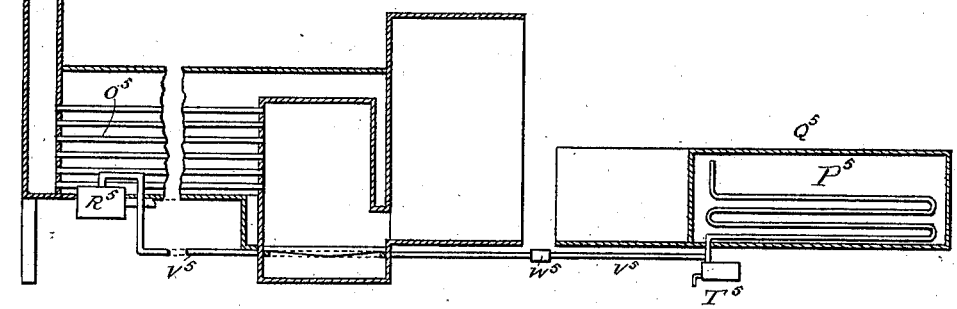
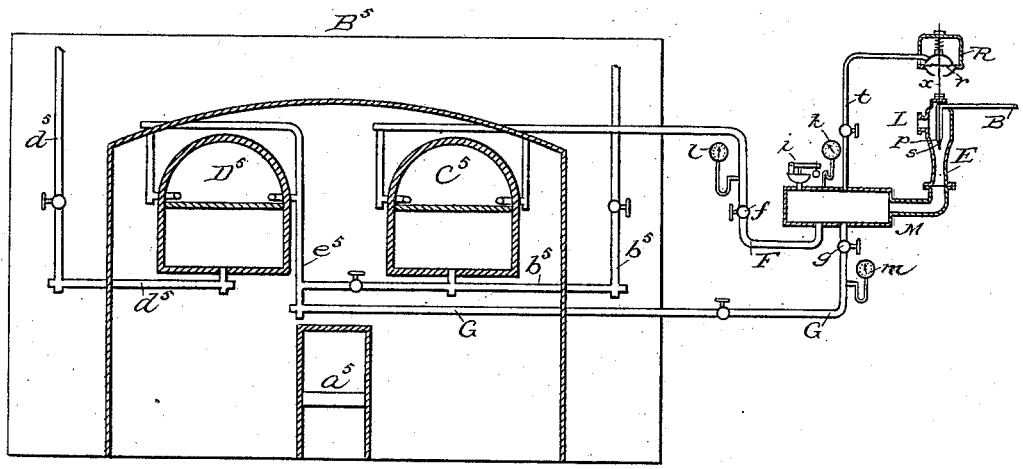

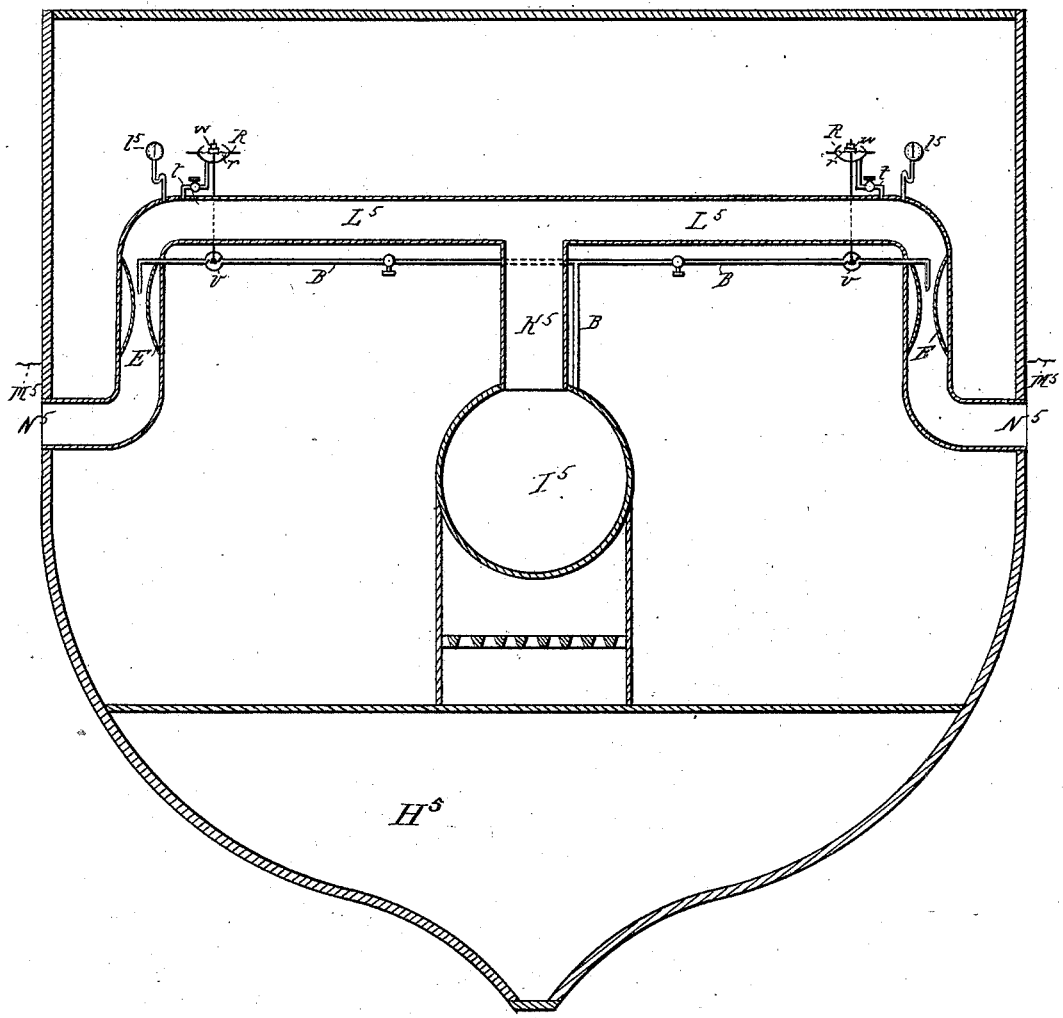

(No Model.) 8 Sheets—Sheet 8.
J. P. GILL.
APPARATUS FOR THE MANUFACTURE AND APPLICATION OF GASES AND VAPORS.
No. 283,998. Patented Aug. 28, 1883.
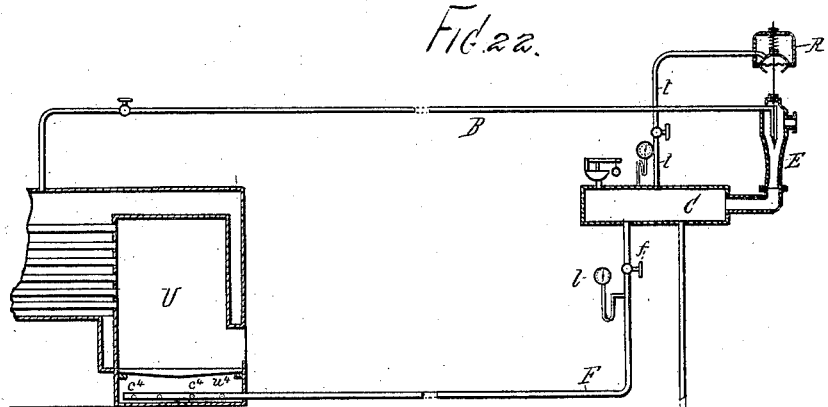
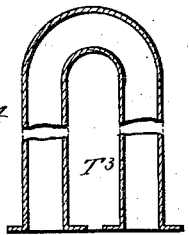
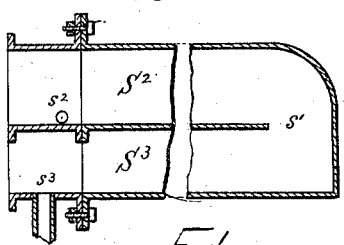
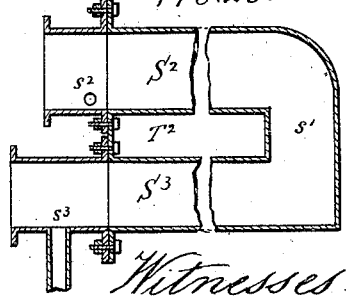
Witnesses:
Wm H Grenelle
Chas G Hawks
Inventor:
Jos. Pearson Gill

UNITED STATES PATENT OFFICE.

JOSEPH PEARSON GILL, OF NEW YORK, N. Y.

APPARATUS FOR THE MANUFACTURE AND APPLICATION OF GASES AND VAPORS.

SPECIFICATION forming part of Letters Patent No. 283,998, dated August 28, 1883.

Application filed July 9, 1883. (No model.)

*To all whom it may concern:*

Be it known that I, JOSEPH PEARSON GILL, of New York, county and State of New York, have invented certain new and useful Improvements in Apparatus for the Manufacture and Application of Gases and Vapors; and I do hereby declare that the following is a full, clear, and exact description of the invention, which will enable others skilled in the art to which it pertains to make and use the same, reference being had to the accompanying drawings, and to the letters of reference marked thereon, which form part of this specification.

My invention relates to the use of gaseous and vaporous materials and air in the manufacture of gases and vapors, whether such gases and vapors be designed for lighting or heating, or for the treatment of metals or manufacture of metals, or for the reduction of ores; and also to the supply of air for the combustion of solid gaseous or vaporous fuels. In all cases where gases and vapors are to be used for the purposes above indicated it is necessary that the ingredients of which they are constituted should be accurately determined, both in respect to quality and quantity. Further, it is a prime essential in the manufacture of said gases and vapors that the proportions of the ingredients should always be accurately maintained; that in the application of the various gases and vapors, whether as ingredients to form a lighting or heating gas or vapor, or as a supporter of combustion, or as a fuel, or for the treatment of ores or metals, the operator should be able to vary the proportions at will with accuracy, to maintain the proportions thus varied, and to know at all times that the gases and vapors are supplied in the proportions determined upon by him. The same accuracy of supply and facility of change as respects quantity and relative proportion are requisite for the air supplied for the combustion of the various fuels and for the kind of flame required. It is also desirable, in order to avoid multiplicity and complication of parts, that the regulating apparatus whereby the proportions of the ingredients which make up the gases and vapors themselves, when supplied to different parts of the same apparatus or to separate and independent apparatus, should itself act for the whole, so that only one pressure and regulating apparatus need be provided, and one may be made to serve the purpose of several.

Part of the objects above stated have been accomplished by me heretofore by means of processes and apparatus shown in United States Letters Patent Nos. 179,475, 241,208, and 275,634, granted to me in 1876, 1881, and 1883. In those patents the air and gases were supplied by means of regulated blowers, which for high pressures are necessary, but which involve more expensive and complicated machinery. In those patents, also, the hydrocarbon liquid is shown as fed by gravity, which varies somewhat with the amount of liquid in the tank, and is less convenient for observation and control.

In the invention which is the subject of this application I use a distributing-receiver between the forcing apparatus and the pipes which directly supply the vapors or gases or air to the chambers, cupolas, or other places where they are used, and I take the pressure which is to move the regulating-valve from this reservoir or receiver, instead of taking it from the moving power itself. By means of this receiver I am able to obtain very nice and accurate regulation of the supply of the materials, and to maintain with great accuracy their proper proportions; and, further, by connecting with the receiver a number of pipes leading either to various parts of the same apparatus or to different and independent apparatus, all as hereinafter fully explained, I am able to make one regulating and forcing device perform the work of several by acting equally upon different apparatus or different parts of the same apparatus, at the same time permitting each independent apparatus to be varied without affecting the others.

Instead of the blowers described in my aforesaid patents, I have provided an apparatus by which the direct force of a current of steam can be utilized to carry forward and supply the air, gases, vapors, or liquids which are to be forced in regulated proportions to the apparatus. This part of the invention consists of devices whereby the current of steam is caused to carry along a supply of air, gas, vapor, or liquid, the current of steam being regulated by a valve connected to a regulating device which is operated by the pressure in the distributing-receiver.

Part of the invention first referred to may be said, in general terms, to consist in the use of the interposed reservoir or receiver, in which a uniform pressure is effected by means of an automatically-regulated supplying device, either of the form above indicated or any other which will regulate the supply of the air, gas, vapor, or liquid and continuously maintain the proportions, the regulating device being operated by the pressure in the receiver.

My invention also consists in various details of construction, whereby these leading features are applied in various forms of apparatus for the manufacture of gases or vapors for the combustion of fuels and for treating ores or metals, whereby, also, they are applied in various forms of furnaces for heating water for engines, to supply air, or air and vapor, or gaseous fuel, to such furnaces, and to special forms of burners.

It also includes details of construction whereby the special form of forcing device and regulator is applied to the submerged smoke-pipes of a ship.

In the accompanying drawings, Figure 1, Sheet 1, shows a longitudinal section of the apparatus, showing the regulator and the valve in the supplying device. Figs. 2, 3, and 4 of the same sheet show various modifications. Fig. 5, Sheet 1, and Figs. 6, 7, 8, 9, 10, 11, 12, Sheet 2, show other forms and adaptations of the principle of the invention. Fig. 13 shows the apparatus applied to superheaters and vaporizers for the production of heating-vapors, and to a locomotive or other furnace. Fig. 14 shows a vertical section of the apparatus applied to several boilers or furnaces in plan. Figs. 15, 16, and 17 show an apparatus for the utilization of the waste products of combustion. Figs. 18 and 19 show the application of the above to a locomotive-boiler. Fig. 20 is a longitudinal section of a locomotive and tender, showing a coil for heating the water in the tank by the exhaust-steam. Fig. 21 is a cross-section of a steam vessel and boiler, showing the adaptation of the automatically-regulated forcing device and pressure-gage to the discharge of the products of combustion. Fig. 22 shows an application of the automatically-regulated supplying device and receiver to the supply of air to the fire-chamber of a locomotive or other furnace, the parts being in longitudinal section. Fig. 23 shows in horizontal section a series of boilers or furnaces with the supplying devices connected thereto. Figs. 24, 25, and 26, Sheet 8, show in section the forms of suitable heaters and vaporizers. Fig. 27 shows in section the application of the regulated air-forcing devices and receiver to retorts. Fig. 28 shows in cross-section the cone-pulleys attached to the valves in Fig. 15. Figs. 29, 30, and 31 show different methods of uniting several of the series of pipes.

In these drawings, and more particularly referring to Fig. 1 on Sheet 1, R refers to the regulating device with a flexible diaphragm, $r$; E, a forcing device for supplying the materials used. B is a steam-pipe from a boiler, (not shown in the drawings,) and terminating in the point $p$. $s$ is a needle-valve passing through the point $p$, for regulating the size of the outlet. The movable diaphragm $r$ is connected with the valve $s$ by a rod, $x$, having a lever attachment, $y$, to reverse the movement of the rod. The forcing device E is connected by a suitable pipe, M, with a receiver, C. $t$ is a pipe with a valve leading from the receiver C to the chamber below the movable diaphragm $r$ in the regulator R. L is a pipe or opening for the admission of the materials used into the forcing device. F, G, and H are pipes with valves $f$, $g$, and $h$ to convey the materials used from the receiver to the points of consumption or use. The receiver C is a chamber to receive the materials preparatory to distribution. It is of larger diameter than that of the inlet-pipe leading to it, and has an area larger than the sum of the areas of all the distributing-pipes leading from it. This receiver, by the action of the pressure in it, which is communicated to the regulator R by means of the pipe $t$, forms an important part of the regulating apparatus.

If air is desired for use, the apparatus is operated as follows: Steam, passing out of the pipe B at the point $p$, draws air through the pipe or opening L and forces it into the receiver C. The amount of pressure caused by the air in the receiver is determined by weights $w$ on the diaphragm $r$. If the pressure in the receiver is greater than that desired, being communicated to the movable diaphragm, it raises it. This action of the diaphragm, by means of the rod $x$ and lever $y$, causes the valve $s$ to partially close the steam-opening $p$. Less steam is thereby forced through, and consequently less air is forced into the receiver. If the pressure in C is below that required, the operation is reversed. The diaphragm $r$ falls, the valve $s$ allows more steam to pass through the opening $p$, and a larger quantity of air is forced into the receiver. By this action the pressure in the receiver C is uniformly maintained, whether one or all of the distributing-pipes are in use or not, and is not affected by any changes in the quantity of the air allowed to pass through them, the pressure of the steam at the point $p$ being uniformly that of the boiler, whether the valve $s$ is partially closed or not. When the distributing-pipes are all closed, the pressure in the receiver C, being communicated to the movable diaphragm $r$, closes the opening $p$, no more steam passes, and action ceases until one or more of the distributing-pipes are again opened. If dry air be required, a suitable condenser may be interposed between the forcing device E and the receiver C. If gas or vapor is required instead of air, it is admitted into the forcing device E through the pipe L, the operation being the same as before.

$i$ indicates a safety-valve attached to the receiver C, and $k$ a pressure-gage. $l$ is a pressure-gage in the pipe F. $m$ is a pressure-gage on the pipe G. $n$ is a pressure-gage on the pipe H. By means of these gages the pressure in the respective pipes is always known, which is determined by the valves $f$, $g$, and $h$. Thus the amount of air, gas, or vapor passing through the pipes is known by the pressure and by the size and length of the pipes. I thus determine and regulate the quantity of air delivered through the pipes $Z^3 Z^4$ for the combustion of the coal in the fire-boxes $B' B^2$ of the cupolas $A'$ and $A^2$; also, of the air delivered through the pipes $Z' Z^2$, and of the gas delivered through the pipes $Y^3 Y^4$, and of the vapors through the pipes $Y' Y^2$, and air through the pipes $X' X^2$, for the manufacture of gas in said cupolas. By use of this regulating and forcing device, I dispense with the use of a steam-engine and large expensive blowers, and at same time an automatic regulation of the supplies is maintained.

In order to dispense with lever $y$, Fig. 1, the pipe $t$, leading from the receiver C, may enter in the top of the regulator R into the chamber above the movable diaphragm $r$, as in Fig. 2. The top of said chamber being air or gas tight, the movable diaphragm is connected with the valve $s$ by means of a straight rod, and is weighted by means of a lever and weight, K, attached to the rod at the point Z. An excessive pressure causes the movable diaphragm $r$ to descend, and by the direct action of the valve closes $p$. A diminished pressure allows the movable diaphragm to rise through the action of the lever and weight K, thus opening the valve $s$ and allowing the passage of a larger quantity of steam.

In lieu of the lever and weight K, I use a spring, N, attached to a rod which is connected with a movable diaphragm and passes up through the top of the regulator R, as in Fig. 3, Sheet 1. The spring in this case acts by tension, having the same effect on the movable diaphragm as the lever and weight K, which acts by an upward pressure. There is a screw at Q for regulating the tension of the spring. When the forcing device E is placed horizontally, as in Fig. 4, Sheet 1, the regulator R is attached to the valve $s$ by means of the crank attachment or bent lever $y^5$. In this case the pipe $t$ connects the receiver C with the chamber below the diaphragm $r$. When the diaphragm is raised, it partly closes the valve $s$, reducing the supply of steam. When the diaphragm is depressed, it enlarges the opening at the point $p$, admitting a larger supply of steam.

In lieu of the crank attachment $y^5$, a rod may have a ratchet attachment, as at $y^6$, Fig. 6, Sheet 2, which answers the same purpose; or the regulator may be attached to the valve $s$ by a direct attachment, as in Fig. 7, the pipe $t$ entering the chamber above the movable diaphragm, which is also acted upon by the tension of the spring N, described in connection with Fig. 3, Sheet 1; or the regulator may be attached to the valve $s$ by means of the rod $x$ and lever $y$, as in Fig. 8. In this case the pipe $t$ enters the chamber below the movable diaphragm, and the spring N acts by pressure instead of tension.

In lieu of the regulator R, I use a corresponding device consisting of a cylinder, O, and piston $p^4$, as in Figs. 9 and 10, Sheet 2, the piston being connected with the valve $s$ by the rod $x$. In Fig. 10 the pipe $t$ enters the cylinder below the piston, and the spring acts by pressure. In Fig. 9 the pipe $t$ enters the cylinder above the piston, which is gas or air tight, the spring N acting by tension; or, in lieu of the spring, there may be a lever and weight, as in Fig. 2, Sheet 1. The connections are similar to those of regulator R.

The forcing device E may be placed in a vertical position, but in a reversed direction to that in Fig. 1, Sheet 1, the regulators R or O being placed below E, and the rod connecting the diaphragm or piston with the valve $s$ passing upward and out of the top of the regulators, as in Fig. 11, Sheet 2, the regulators in other respects being constructed substantially in the manner hereinbefore described.

I also use regulator R, in combination with receiver C and forcing device E, for the purpose of regulating the supply of steam in the pipe B, Fig. 5, Sheet 1, before it reaches the point $p$. The movable diaphragm $r$ is connected by a rod, $x$, with the valve $v$ on the line of the steam-pipe B, which connects the boiler with the forcing device E. The pressure from the receiver C, being communicated to the movable diaphragm $r$, causes it to rise or fall, in the manner hereinbefore described, which closes or opens the valve $v$, thus admitting a smaller or larger quantity of steam to pass to the point of discharge $p$ in the forcing device E, and thus forcing a less or greater quantity of air or gases into the receiver C. In this manner a uniform pressure is maintained in the receiver C, in the manner and for the purpose as hereinbefore described.

In lieu of the construction of the forcing device E with the opening L for the admission of air or gas on the side, as in the preceding figures, I use the forcing device with the opening L for the admission of air at the end, as in Fig. 12, Sheet 2, there being no opening in the side except for the admission of the steam-pipe P, the construction in other respect being substantially the same.

I also use the combination of the regulator R, the receiver C, and the forcing device E, as hereinbefore described, in lieu of the forcing devices described in specification and illustrated in drawings, Figs. 2, 3, and 5, of United States Letters Patent No. 179,475, for the purpose of carrying on the operations incidental to the invention covered by said patent.

I also use the combination of the regulator R, the receiver C, and the forcing device E, as hereinbefore described, in lieu of the forcing device $X^2$ in Fig. 2 in drawings of United States Letters Patent No. 182,456, and also of the forcing device $X^2$ in Fig. 2, Sheet 1, in drawings of United States Letters Patent No. 182,457, for the purpose of carrying on the operations incidental to the inventions covered by said patents.

I also use the combination of the regulator R, the receiver C, and the forcing device E, as hereinbefore described, in lieu of forcing devices P and P' described in specification and illustrated in Fig. 5, Sheet 2, in drawings of United States Letters Patent No. 241,208, for the purpose of carrying on the operations incidental to the inventions covered by said patent, and also in lieu of forcing and regulating devices D and D" in Figs. 1 and 2 in drawings and specification of United States Letters Patent No. 275,634, for the purpose as therein set forth, and also in lieu of forcing and regulating devices U in drawings and specifications of United States Letters Patent Nos. 275,635 and 275,761, for the purpose as therein set forth.

I also use the combination of the regulator R, the receiver C, and the forcing device E, as hereinbefore described, in lieu of the natural draft for the supply of air to furnaces for combustion, as illustrated in Sheets 1, 2, and 3 of United States Letters Patent No. 275,636, making the application of the apparatus to the fire-box and burners in the furnaces by connecting pipes and valves, substantially in the manner hereinbefore described.

I combine the inventions as described in United States Letters Patent Nos. 241,208 and 275,634, for the method and apparatus for the production of a heating-vapor by the use of heated air and steam and petroleum or its distillates, and for the utilization thereof by a perfect combustion in furnaces automatically supplied with vapor and with air for combustion, the total and relative quantities of the air, steam, and vapor being varied at will with ease and promptness. I apply the same to the heating of the boilers of locomotives and of steamships, steamboats, and steam-crafts of all kinds, and also of stationary power, and for that purpose make use of any suitable combustion-chamber or of any furnace in actual use.

In United States Letters Patent No. 241,208 a combination of automatic-acting regulators and automatic forcing devices insures the supply of the precise quantity of air required for the perfect combustion of the fuel in furnaces, and for the production of a flame of definite quantity and quality for the work to be performed, and also for the automatic and regulated delivery of gases and vapors forming the fuel. This method of combustion obtains from the fuel all the heat-units it is capable of producing, and retains the heat in the furnace, instead of drawing it through and out of the furnace, as in the natural draft. No smoke is produced, nor are any obstructions formed in the flues of the furnace. The operator is also enabled, without delay, by means of changes in the adjustment of the regulators, to vary at will the consumption of fuel and the intensity of the flame, and to avoid the waste of fuel caused by other methods. In United States Patent No. 275,634 is disclosed a method by which hydrocarbon liquids—such as petroleum and similar heavy oils—may be utilized for fuel. Heated air and superheated steam are used to assist in vaporizing the liquid hydrocarbons in a vaporizer in definitely-regulated and in proportionate quantities at temperatures above that of the boiling-point of the liquid used and below that of its destructive distillation, and to absorb and convey the vapors thence to burners in furnaces, to which air is supplied automatically in the proportion required to effect the perfect combustion of the commingled gaseous vapors.

In combination with said inventions, and in lieu of the forcing and regulating devices described in said patents, I preferably use, under given conditions for said purpose, the combination of regulator R, receiver C, and forcing device E in any of the variations thereof, as hereinbefore described, to which I apply the following additional apparatus, as in Sheet 3, Fig. 13. The drawing of the apparatus used is made upon an enlarged plan and with extended connections, in order to exhibit in detail the application of the apparatus for the purpose intended in a clear and distinct manner; but I do not restrict myself to the precise arrangement of parts as shown therein, but in all cases make the application in a manner to suit the dimensions of the space given, and also the convenience of the operator, and more particularly so in restricted places, as in locomotives and small steam-craft, the relative position of the several parts of the apparatus and their connections being varied to suit the conditions of their applications to any particular description of engine.

U (see Fig. 14) is a combustion-chamber of a boiler in longitudinal section. I is a front view of a furnace for superheating air and vaporizing liquid hydrocarbon. c is the fire-box and fire-bars; e', the burners located in the sides of the fire-box c. p' is a branch pipe and valve and pressure-gage to convey the vapors to the fire-box c. D is a superheater in said furnace. P is a vaporizer for vaporizing hydrocarbon liquids. R is the regulator, as hereinbefore described. E is the forcing device, as hereinbefore described. B is the steam-pipe between the boiler and the forcing device; C, the receiver, as hereinbefore described. t is the pipe and valve connecting the receiver with the regulator R; F, the pipe conveying air from the receiver C to the superheater D in furnace I; G, the pipe for conveying air to the burners u in the combustion-chamber U of the boiler, for the purpose of supplying air for the combustion of the hydrocarbon vapor. W is a pipe connecting the superheater D with the vaporizer P. V is a pipe for conveying the combined heated air and hydrocarbon vapors to the burners u. n' is a pressure-gage on said pipe. o' is a pyrometer for exhibiting the temperature of the vapor. T is a tank for storing the hydrocarbon liquid. t' is a glass gage with a graduated scale, for exhibiting the quantity of liquid in the tank. T' is a smaller distributing-tank. $t^2$ is a glass gage with a graduated scale, for exhibiting the quantity of the liquid used. X is a pipe and valve connecting the tanks. J is an air-pipe leading from the reservoir C to the tanks. J $q$ $q'$ are valves on said pipe. $r^4$ is a pressure-gage on said pipe. Y is a pipe leading from the tank T' to the vaporizer P. $d$ is a valve on said pipe. $f$ is a valve on the pipe F, having a suitable double cone-pulley attached to its stem. $g$ is a valve on the pipe G, having a suitable cone-pulley attached to its stem, the pulley being in the reversed position to that on $f$. The valve $d$ on pipe Y also has a suitable cone-pulley attached to its stem. $l'$ is a suitable band connecting the cone-pulleys $f$ and $g$. $m'$ is a band connecting the cone-pulleys $f$ and $d$. When the valve $f$ is partly opened or closed for the purpose of admitting more or less air to the vaporizer P, the valve $g$ is opened or closed in like proportion for admitting a proportionate quantity of air for combustion to the burners $u$, and simultaneously therewith the valve $d$ is opened or closed, admitting a proportionate quantity of hydrocarbon liquid to the vaporizer P. In this manner the relative quantities of air and vapor are maintained by one movement, and the special amount of heat required can be obtained and varied at will. If more or less air is required for combustion, the valve $g$ may be adjusted without moving the valve $f$, and the proportion, when fixed, is thereafter automatically maintained, and in like manner the valve $d$ may be adjusted when required. To each of these valves is attached a scale showing the degree of opening of the valve—that is, showing the point when the full amount of vapor or air is passed through, and also the points at which the pipe will pass three-fourths, one-half, and one-quarter of its full capacity. With these points fixed, any intermediate quantity is easily regulated. By means of the pressure, as indicated by the pressure-gages $l$ and $m$, and of the sizes and lengths of the pipes F and G, the quantity of air passing may always be known and determined, and by means of the glass tube and graduated scale $t^2$ and valve $d$ the quantity of liquid passing out of the tank T' is also known and determined.

In firing up, any auxiliary steam-power as may be most convenient may be used, and a temporary coal or wood fire in furnace I may be employed to heat the superheater D and vaporizer P until steam is generated in the boiler to be used.

In order to fill the distributing-tank T' with the liquid from the reservoir-tank T, air is admitted from the receiver C through the pipe J and valve $q$, the pressure of which forces the liquid from the tank T through the pipe and valve X into the tank T', which having been filled, the valve $q$ is closed. When in operation, air is admitted from the receiver C, through the pipe J and valve $q'$, into the tank T'. The pressure of the air forces the liquid through the pipe Y into the vaporizer P, the amount of liquid passing being regulated by the valve $d$ on the pipe Y.

In firing up, steam is admitted through the pipe and valve Z from an auxiliary boiler (not shown on the drawings) to the forcing device E, which forces air into the receiver C. The pressure from it is communicated through the pipe $t$ to the regulator R, the required pressure being fixed by means of the spring N and screw Q. A temporary coal or wood fire is built in the fire-box $c$ of the furnace I for the purpose of vaporizing the liquid in the vaporizer P. The valve $f$ is opened, admitting air to the superheater D, and thence by connecting-pipe W to the vaporizer P. Simultaneously therewith the valve $d$ on the pipe Y is opened, admitting hydrocarbon liquid to the vaporizer, and the valve $g$ is also opened, admitting air for combustion to the burners $u$. The mixed air and vapors are then burned in the combustion-chamber U, and steam is generated in the boiler $B^3$. The proper temperature of the hydrocarbon vapors as they pass through the pipe V to the burners $u$ is determined by means of the pyrometer $o'$, which temperature must be between the boiling-point of the liquid used and that of its destructive distillation. The pipe V, when exposed, I inclose in a jacket or large pipe, through which steam circulates, for the purpose of maintaining or aiding to maintain the proper temperature of the hydrocarbon vapor. When steam is generated in the boiler $B^3$, it is admitted through the pipe B to the forcing device E, the steam from the auxiliary boiler being shut off, and the hydrocarbon vapors and air are admitted through the pipes $p'$ and $r'$ to the burners $e'$ in the furnace I. The operation then becomes continuous and automatic in its action, the management of the several parts thereafter being as hereinbefore described.

The regulating-valves $f$, $g$, and $d$ and the pressure-gages $l$ and $m$ may be placed in any convenient position between the receiver C and the furnace I, and where more than one boiler or furnace is to be heated I place the said regulating-valves and pressure-gages between the furnace I and the boilers, each boiler having its own set of valves, as in Fig. 14, Sheet 4, or some equivalent arrangement which enables one set of superheaters and vaporizers to supply several boilers. By this arrangement the proper proportion and supply of air and liquid are maintained both in the vaporizer and at the points of combustion, whether one or more boilers are in use, either in whole or in part. In this arrangement the air is conveyed from the receiver C to the superheater D through the pipe F, and thence to the vaporizer P, and thence through the pipe V and branch pipes to burners $u$ in boilers $B^3$ $B^3$ $B^3$. Air for the combustion of the vapors is also conveyed through the pipe G and its branch pipes to the burners $u$. The hydrocarbon liquid from tank T' is conveyed by means of the pressure of the air from the receiver C, through the pipe Y and branch pipes, to regulating-valves $d\ d\ d$, located near each boiler, between the vaporizer and the boilers. It is thence conveyed by means of pipe $Y^5$ to the vaporizer P. Near the valves $d\ d\ d$ is the regulating-valve $t^4$ and pressure-gages $s^4$ on the branch pipes V and the regulating-valves $g$ and pressure-gage $m$ on the branch pipes G. The valves $t^4$ and $g$ and the valves $t^4$ and $d$ are connected by bands, and are operated in the manner hereinbefore described. By this manner of construction and connection, when the valve $t^4$ is opened or closed, thus admitting more or less air and hydrocarbon vapor to the burners $u$ from the vaporizer P, the valve $g$ is proportionately opened or closed, admitting more or less air for combustion to the burners $u$, and at the same time the valve $d$ is opened or closed, admitting a proportionate quantity of liquid to the vaporizer P. In this manner any one more of the fires in boilers $B^3$ can be increased or diminished at will, and by the action of the valve or valves regulating them the proportionate quantity of liquid required for vaporization is simultaneously increased or diminished with the air and the relative proportions of air and vapor uniformly maintained. The pressure in the receiver C and tank T', remaining unchanged, gives them power to respond at once to any demands upon them to their full capacity, and at same time does not increase the pressure with which the air and vapor are supplied to any of the burners in said boilers when one or more of the branch pipes are shut off.

All these furnaces have close combustion-chambers. The doors to the fire-boxes and to the ash-pits are made close fitting. There being no draft, there is no suction of air through the furnace. The circulation and exit of the products of combustion being caused by the pressure of the blast, the furnace is thereby kept full of the heated products of combustion. There is no loss of heat by the too rapid escape, as there would be by a natural draft or by a fan or exhauster at the exit end of the furnace. The exit-pipe is provided with a damper to graduate the opening to the amount of fuel consumed, and to prevent loss of heat. These furnaces are all smoke-consumers, no smoke being delivered with the products of combustion from the smoke-stack or outlet-flue. The escaping products of combustion are utilized to heat the water for the boilers or the air for the blast by means of suitable connections with the water-tank, as in locomotives, or by suitable covered and protected coils, as in Fig. 15, Sheet 5, or pipes, as in Fig. 16, Sheet 5, or chambers through which the products of combustion are forced, or through cupolas, as $A^5$, hereinbefore described, filled with non-combustible mineral materials to retain the waste heat for raising the temperature of the air alternately passing through it.

In Fig. 15, Sheet 5, $W^4$ represents a coil of pipe in a cast or wrought iron casing. The products of combustion enter the casing near its top, as at $X^4$, and are discharged on the opposite side, near the bottom, as at $X^5$. Water is introduced into the coil at the bottom, as at $z^5$, and, passing up through the coil, is discharged at the top, as at $x^5$. During its passage it becomes heated by the products of combustion which surround the coil during its passage through the casing.

In Fig. 16, Sheet 5, $U^5$ represents a series of pipes, which are connected at the top and bottom by the pipes $u^5$, of sufficiently enlarged dimensions, all being inclosed in a casing of iron or other suitable material. The products of combustion enter the top of the iron casing, as at $v^5$, and is discharged at the bottom and from the opposite end or side, as at $w^5$. The water enters the series of pipes at the bottom, as at $w^4$, and, ascending the pipes, passes out of the upper connecting pipe or chamber, $u^5$, at the opposite end of the series, as at $x^4$, near the inlet of the products of combustion. Sheet 5, Fig. 17, is a side view or cross-section of the pipes $U^5$, with the connecting-pipes $u^5$ at top and bottom. Any number of these series of pipes may be connected together when desired.

Devices represented in Figs. 15 and 16 may be placed in the course of a smoke-stack of a steam-vessel, for utilizing the heat of the escaping products of combustion by heating the water for the boiler.

When applied to heating the water for locomotive-boilers, the application in general terms, is as in Figs. 18 and 19, Sheet 5. $O^5$ represents a locomotive tubular boiler; $U^5$, $u^5$, the series of pipes, as in Figs. 16 and 17, which are inclosed in a chamber between the end of the tubes and the smoke-stack, the latter being separated from the boiler by the inclosing-chamber and pipes. The escaping products of combustion surround the pipes, and, passing down the inclosing-chamber, escape at the opposite end at the bottom, as at the opening $w^5$, into the smoke-stack $S^5$, and are thence discharged. The water from the tank enters the bottom of the series of pipes through the pipe $w^4$, and is discharged at the top through the pipe $x^4$, through which it is conveyed to the boiler. The change in the construction of the boiler is simply an enlargement of the base of the smoke-stack. Under this method of heating locomotives the exhaust-steam is not required as a blast for the purpose of forcing the draft through the smoke-stack, and may therefore be utilized for heating the water in the tank by passing it through the exhaust-pipe from the steam-cylinder, and through a coil placed in the water in the tank, and thence discharging it through the proper outlet, a suitable trap being attached to the lowest point of the steam-coil to carry off the condensation.

In Fig. 20, Sheet 6, $O^5$ represents a locomotive-boiler; $R^5$, the steam-cylinder; $P^5$, the coil of pipe in the water-tank $Q^5$ on the tender. $V^5$ is the discharge-pipe from the cylinder, connecting with the coil in the water-tank. $W^5$ is a flexible joint; $T^5$, a trap to receive and throw off the condensed steam from the coil.

When turreted war-ships or other steam-vessels are constructed with intent to avoid the exposure of the smoke-stack and steam-pipes above the line of the deck, the products of combustion from the furnaces of the boilers may be conveyed by several pipes of equal capacity to each side of or to the rear end of the vessel, below the water-line, where the discharge can be regulated to overcome the back-pressure of the water by means of forcing device E and regulator R near the outlet of said pipes, connected and constructed in a suitable manner.

Fig. 21, Sheet 7, is a cross-section of a steam-vessel and of a boiler, located on the medial line of it. $H^5$ represents the hull; $I^5$, the boiler; $K^5$, the smoke-stack or main discharge-pipe for the products of combustion. $L^5$ are branch flues leading from $K^5$ and opening through the sides of the vessel under the surface of the water at the points $N^5$. $M^5$ represents the water-line. E is a forcing device similar to that shown on Sheet 2, Fig. 12, and located in the branch pipes $L^5$, above the level of the water-line, for the purpose of counteracting the back-pressure of the water. B are steam-pipes leading from the boiler to the forcing devices E. R are the regulators for regulating the outward passage of the products of combustion. $t$ are pipes with valves, connecting the regulator R with the branch flues $L^5$ at points above or on the boiler side of forcing devices E. $v$ are valves on the line of the steam-pipes B. $l^5$ are pressure-gages on the flues $L^5$. The flexible diaphragms or pistons in the regulators R are weighted by means of a spiral spring, so that the pressure in the flues $L^5$, as indicated by the pressure-gages $l^5$, shall be at zero or at slight back-pressure. The valve $v$ is so constructed that when the diaphragm rises the valve opens and allows the passage of a larger quantity of steam, and when the diaphragm falls a less quantity is allowed to pass. If the pressure as indicated by the gage $l^5$ is greater than that fixed by the spring on the diaphragm or piston, it is communicated through the pipe $t$ to the regulator R. The valve $v$ is partly opened, allowing more steam to pass, which increases the flow of the products of combustion through the forcing device E until the normal pressure in $L^5$ is restored. If the pressure in $L^5$ is less than that fixed by the spring acting upon the flexible diaphragm, the diaphragm falls, the valve $v$ is partially closed, less steam passes, the products of combustion are carried less rapidly through the forcing device E, and the pressure in $L^5$ is restored to its normal limit. In this manner a uniform pressure is maintained in the flues $L^5$, the products of combustion are discharged as fast or as slowly as they are formed, and any excess of back-pressure or variable pressure caused by the weight of the water outside of the vessel is overcome. Thus the combustion in the furnaces is maintained practically as well as if the smoke-stack discharged into the air in a vertical position.

The draft being produced by a blast of air delivered into the furnace below the fuel, and there being no suction or "wire-drawing" of the products of combustion, the full benefit of the fuel is obtained by the boiler. The branch flues are covered with mineral wool, asbestos, or other non-conducting material, for the purpose of confining the heat of the products of combustion within the flues.

The foregoing is a general outline of the application of the process hereinbefore described. The sizes, location of particular parts, and other details of the work are to be determined by the requirements of the boilers and vessels. The location and direction of the outlets are fixed in such manner as to aid and not to interfere with the working of the vessel.

When I use the combination of regulator R, forcing device E, and receiver C for the purpose of supplying air for the combustion of coal in the boilers of locomotives and of steam-vessels, I apply it in the following manner, as in Sheet 8, Fig. 22: R represents the regulator; E, the forcing device; C, the receiver; $t$, the pipe and valve connecting the receiver and the regulator R; B, the steam-pipe leading from the boiler to the forcing device E, substantially as hereinbefore described. U represents the combustion-chamber of a boiler of a locomotive or steam-vessel; $u^4$, the ash-pit. F is a pipe leading from the receiver C to the ash-pit of the furnace, having openings at $c^4 c^4 c^4$ for the discharge of the air. $f$ is a valve, and $l$ is a pressure-gage on the pipe F. The air in the receiver C is maintained at a constant and uniform pressure in the manner hereinbefore described. Air is admitted to the combustion-chamber through the valve $f$, and by means of the pressure in the pipe F, as indicated by the pressure-gage $l$ and the size and length of the pipe F, the quantity of air passing at any time is known, which may be varied by means of the valve $f$ to meet any variation in the amount of coal that may be necessary to use, and also in the character of the flame required, which may be either an intense concentrated flame or one having a large volume. The air by these means being supplied in the proper proportion, there is a perfect combustion of the fuel without smoke and without waste of heat or material. The smoke-stack is provided with a damper to adapt the opening to the quantity of the products of combustion that is being discharged, to avoid a too rapid discharge, and consequent loss of heat.

In Sheet 8, Fig. 23, $E^5 E^5 E^5 E^5$ represent a series of boilers, each with a fire-box, U. G is a main pipe leading from the receiver C to the boilers. $g^3 g^3 g^3 g^3$ are branch pipes and valves leading from the pipe G to the ash-pits of the boilers. $m\ m\ m\ m$ are pressure-gages on the branch pipes $g^3 g^3 g^3 g^3$. By means of the valves and pressure-gages the quantity of air passing to each of the boilers is regulated and adjusted in the manner hereinbefore described to fire-box U, Fig. 22, Sheet 8, the pressure in the receiver C not being affected by any variation in the quantity of air discharged through either one or more of the branch pipes $g^3$ $g^3$ $g^3$ $g^3$.

I use in a close combustion-chamber the burners described in specification and illustrated in Figs. 3 and 4, Sheet 1 of drawings, in United States Letters Patent No. 241,208.

Suitable heaters and vaporizers may be U-shaped retorts, as $T^3$, in Fig. 24, Sheet 8, or double retorts, as in Fig. 25, Sheet 8, having an upper and lower chamber, as $S^2$ and $S^3$, with a communicating passage, $s'$, in the rear, the inlet being at $s^2$ and the outlet at $s^3$.

When dry air or gas is required for use, a condenser is placed between the forcing device E and the receiver C, or between the receiver C and the point of consumption, for the purpose of condensing the steam admitted through the forcing device E.

To withstand high temperatures, the pressure not exceeding fifteen or twenty pounds, I use a pressure-gage constructed in any convenient or well-known manner.

When I manufacture carbonic-oxide gas (CO) and carbonic-acid gas, ($CO_2$,) as described in United States Letters Patent Nos. 182,456 and 182,457, I employ, in addition to the apparatus therefor as shown in said patent, portions of the apparatus illustrated in drawings of Letters Patent Nos. 179,474 and 179,475, and in Sheet 3, Fig. 3, of No. 257,636, in the manner hereinafter described, and as illustrated in drawings, Fig. 27, Sheet 9, showing the application of the combination of the regulator R, air-forcing device E, and the receiver C to horizontal retorts in said patents.

$B^5$, Fig. 27, Sheet 9, is a bench of horizontal retorts heated by a furnace, $a^5$. $C^5$ is one of the retorts for the manufacture of carbonic-oxide gas. $D^5$ is one of the retorts for the production of carbonic-acid gas. R is the regulator, E the forcing device, and C the receiver. Retort $C^5$ is filled with anthracite coal or any similar solid hydrocarbon, and the retort $D^5$ with non-combustible substances through which the gas may pass. Air is conveyed by means of the pipe F to the retort $C^5$ in the proper proportion to convert the coal into carbonic-oxide gas by the union of the oxygen of the air with the carbon of the coal. If carbonic-oxide gas is required for use, it is conveyed by means of the pipe $b^5$ to a gas-holder or point of consumption. If carbonic-acid gas is required, the carbonic-oxide gas is conveyed by the pipe $c^5$ to the retort $D^5$, air being admitted at the same time from the receiver C through the pipe G in the proper proportion to convert the carbonic oxide into carbonic-acid gas by the union of the oxygen of the air with it. During the passage of the mixed carbonic-oxide gas and air through the incandescent materials in $D^5$, carbonic-acid gas is produced, which is thence conveyed by means of the pipe $d^5$ to a gas-holder or point of consumption.

In lieu of anthracite coal, hydrocarbon vapors may be employed by means of the apparatus shown in the United States Letters Patent hereinbefore referred to, or by any form of apparatus for such purpose described in the present application. For this production of hydrocarbon vapors, and for the purpose of commingling them with gases or air, and for the better regulation of the proportionate quantity of the hydrocarbon vapor required for use, I employ a vaporizer, a heating-jacket, and a regulated supply-tank. The commingled vapors thus produced are used for heating purposes, and also for any of the purposes for which hydrocarbon vapors are employed in any of the inventions covered by the United States Letters Patent hereinbefore specifically named. In all cases where the operations, constructed as hereinbefore described, require the use of valves, pressure-gages, and thermometers, they are to be attached and connected in a proper manner.

The vaporizer herein shown is not claimed in this application, being also shown and claimed in an application filed of even date herewith, marked "Division C."

Having thus fully described my invention, I claim—

1. In combination for the regulated delivery of air, gases, vapors, and liquids, regulator R, forcing device E, and distributing-receiver C, with connecting-pipes and valves and pressure-gages, constructed and operated substantially in the manner herein described, and for the purpose set forth.

2. An improved regulated forcing device for supplying air, gases, or vapors to gas-generators and to furnaces for combustion, consisting of a receiver, a forcing-chamber, a steam-pipe within said chamber, a needle-valve in said steam-pipe, connected to the diaphragm of a regulator, an inlet-pipe to the forcing-chamber, and a pressure-pipe from the receiver to the diaphragm-chamber, the parts being constructed, combined, and operated substantially in the manner herein described, and for the purpose set forth.

3. A distributing-receiver, C, combined with a suitable forcing device, E, and regulator R, connected to said receiver by pipe $t$ and a series of connecting-pipes provided with valves and pressure-gages leading from said receiver, and each adapted to convey air, gas, vapors, and liquids to the vapor or gas generator, or to furnaces for combustion, all constructed, connected, and operated substantially in the manner herein described, and for the purpose set forth.

4. In combination with a fire-chamber of a boiler closed to the outer air, the distributing-receiver C and air-forcing device E, having pipe B and regulating parts $t$ R, operating the valve $s$, with pipe G, leading to the burners in the combustion-chamber, and pipe F, leading to the superheaters D, and gas or vapor generating apparatus interposed between the receiver and the fire-chamber, storage-tank T, distributing-tank T', and liquid-supply pipe Y, leading to the vaporizers P, all constructed, connected, and operated substantially in the manner herein described and set forth.

5. In combination with fire-chambers of furnaces closed to the outside air, the distributing-receiver C and air-forcing device E, having pipe B and regulating parts $t$ R, operating the valve $s$, with pipe G, leading to the burners in the combustion-chamber, and pipe F, leading to the vaporizers, and gas or vapor generating apparatus interposed between the receiver and fire-chambers, the reservoir and distributing-tanks T and T', liquid-supply pipe Y, leading to the vaporizers P, pipe V, leading to the furnaces, and valves $t^1 g d$ in the pipes V G Y, having cone-pulleys connected by suitable attachments and interposed between the vapor-generators and the furnaces, all constructed, connected, and operated substantially in the manner herein described and set forth.

6. In combination, a boiler having a closed grate, a distributing-receiver, C, and a forcing device, E, having pipe from the boiler and regulating parts $t$ and R, and a steam-coil connected with the boiler, for utilizing the waste steam, all constructed, connected, and operated substantially in the manner herein described and set forth.

7. In combination with the smoke-stack $K^5$, the connected smoke-flues $L^5 L^5$, and discharge-openings $N^5 N^5$ below the water-level, a steam-pipe, B B, having valves $v$ and opening into the forcing devices E E in said flues, valve-stems and pressure-regulators R R, connected to the smoke-flues by the pipe $t\ t$, and pressure-gages, all constructed and connected substantially in the manner herein described and set forth.

8. In combination with a coal-burning furnace closed to the outside air, the distributing-receiver C and air-forcing device E, having pipe B and regulating parts $t$ R, operating the valve $s$, and pipe F, leading to the ash-pit of the furnace, having valve $f$ and pressure-gage $l$, for the purpose of supplying air for the combustion of the fuel, all constructed and connected substantially in the manner herein described and set forth.

9. In combination with a series of coal-burning furnaces closed to the outside air, the distributing-receiver C and air-forcing device E, having pipe B and regulating parts $t$ R, operating the valve $s$, and pipe G, leading to the ash-pits of the furnaces, having valves $g^3$ and pressure-gages $l$ on the branch pipes to each furnace, for the purpose of supplying air for the combustion of the fuel, all constructed and connected substantially in the manner herein described and set forth.

10. In combination, a locomotive-boiler connected with the automatic regulating air-supplying device, consisting of regulator R, forcing device E, and distributing-receiver C, with their connections, valves, and pressure-gages, for the purpose of supplying air for the combustion of the fuel, and the heating coil or pipes $U^5$, interposed between the flues of the boiler $O^5$ and smoke-stack $S^5$ for the purpose of heating the water on its passage to the boiler by means of the escaping products of combustion, all constructed, connected, and operated substantially in the manner herein described, and for the purpose set forth.

11. In combination, a boiler or boilers of a steam-vessel connected with the automatic regulating air-supplying device, consisting of a regulator, R, forcing device E, and distributing-receiver C, with their connections, valves, and pressure-gages, for the purpose of supplying air for the combustion of the fuel, and the heating coil or pipes $U^5$, located in the smoke passages or flues leading from each boiler to the main smoke-stack, for the purpose of heating the water in its passage to the boiler by means of the escaping products of combustion, all constructed, connected, and operated substantially in the manner herein described, and for the purpose set forth.

12. In combination, the distributing-receiver C and its forcing device and regulator R, a furnace, U, and interposed gas or vapor generating apparatus, pipes for supplying air and vapor or gas to the furnace, and valves with cone-pulleys and connecting devices, whereby the valves may be moved simultaneously and uniformly, substantially in the manner herein described, and for the purpose set forth.

In testimony that I claim the foregoing as my own I affix my signature in presence of two witnesses.

JOSEPH PEARSON GILL.

Witnesses:
WILLIAM HANSON TURTON,
JOSEPH B. GILL.